United States Patent
Nishikawa

(10) Patent No.: US 12,430,129 B2
(45) Date of Patent: Sep. 30, 2025

(54) INSTRUCTION GENERATING METHOD, ARITHMETIC PROCESSING DEVICE, AND INSTRUCTION GENERATING DEVICE

(71) Applicant: Preferred Networks, Inc., Tokyo (JP)

(72) Inventor: Takeshi Nishikawa, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 97 days.

(21) Appl. No.: 18/048,927

(22) Filed: Oct. 24, 2022

(65) Prior Publication Data

US 2023/0126594 A1    Apr. 27, 2023

(30) Foreign Application Priority Data

Oct. 27, 2021  (JP) ................................. 2021-175277

(51) Int. Cl.
 *G06F 9/30*    (2018.01)
 *G06F 8/41*    (2018.01)

(52) U.S. Cl.
 CPC .............. *G06F 9/3001* (2013.01); *G06F 8/41* (2013.01); *G06F 8/4441* (2013.01); *G06F 8/447* (2013.01)

(58) Field of Classification Search
 CPC ........ G06F 9/3001; G06F 8/41; G06F 8/4441; G06F 8/447; G06F 9/3004; G06F 9/3885; G06F 15/80; Y02D 10/00

See application file for complete search history.

(56) References Cited

U.S. PATENT DOCUMENTS

| | | | | |
|---|---|---|---|---|
| 4,956,800 | A | * | 9/1990 | Kametani ............. G06F 9/3877 |
| | | | | 712/43 |
| 6,304,958 | B1 | * | 10/2001 | Kiuchi ................ G06F 9/30036 |
| | | | | 712/E9.046 |

(Continued)

FOREIGN PATENT DOCUMENTS

| | | | | | |
|---|---|---|---|---|---|
| JP | 2006313422 | A | * | 11/2006 | ......... G06F 9/30043 |
| JP | 2011-133972 | | | 7/2011 | |
| JP | 2018045370 | A | * | 3/2018 | ............... G06F 7/57 |

OTHER PUBLICATIONS

Preferred Networks, Inc., "Accelerating Deep Learning Workloads with the MN-Core Compiler", Jun. 11, 2021, <URL: https://tech.preferred.jp/en/blog/mncore-compiler-1/>, Retrieved on Jul. 14, 2021.

(Continued)

*Primary Examiner* — Daxin Wu
(74) *Attorney, Agent, or Firm* — IPUSA, PLLC

(57) ABSTRACT

With respect to a method of generating an instruction to be executed by an arithmetic processing device including first blocks, each of the first blocks including execution sections, the method includes generating, by at least one processor, at least one data transfer instruction that causes the arithmetic processing device to perform at least one of first data transfers, second data transfers, third data transfers, or fourth data transfers. Transfer sources of the first data transfers are execution sections, transfer destinations of the first data transfers are execution sections, transfer sources of the second data transfers are first blocks, transfer destinations of the second data transfers are first blocks, transfer sources of the third data transfers are first blocks, transfer destinations of the third data transfers are execution sections, transfer sources of the fourth data transfers are execution sections, and transfer destinations of the fourth data transfers are first blocks.

20 Claims, 10 Drawing Sheets

(56) References Cited

U.S. PATENT DOCUMENTS

| | | | | |
|---|---|---|---|---|
| 8,929,369 | B1* | 1/2015 | Shain | H04L 12/185 |
| | | | | 709/217 |
| 9,043,486 | B2* | 5/2015 | Bailey | H04L 69/326 |
| | | | | 709/236 |
| 9,135,027 | B1* | 9/2015 | Basumallik | G06F 9/4552 |
| 9,692,813 | B2* | 6/2017 | Weber | G06F 9/54 |
| 9,733,978 | B2* | 8/2017 | Suarez Gracia | G06F 9/5005 |
| 10,397,011 | B2* | 8/2019 | He | H04L 45/16 |
| 2009/0006642 | A1* | 1/2009 | Dickens | H04L 65/611 |
| | | | | 709/231 |
| 2009/0083524 | A1* | 3/2009 | Van Wel | G06F 9/30181 |
| | | | | 712/E9.017 |
| 2010/0191938 | A1* | 7/2010 | Hasegawa | G06F 9/30145 |
| | | | | 712/E9.028 |
| 2011/0010529 | A1* | 1/2011 | Yamasaki | G06F 9/30087 |
| | | | | 712/E9.016 |
| 2017/0185519 | A1* | 6/2017 | Marshall | G06F 12/0891 |
| 2018/0011663 | A1* | 1/2018 | Kuwamura | G06F 3/0004 |
| 2019/0386931 | A1 | 12/2019 | Sinha et al. | |
| 2022/0019491 | A1 | 1/2022 | Higuchi et al. | |
| 2022/0052820 | A1* | 2/2022 | Ling | H04W 72/23 |
| 2023/0048133 | A1* | 2/2023 | Esposito | G06F 3/0649 |

OTHER PUBLICATIONS

Preferred Networks, Inc., "MN-Core Accelerator for Deep Learning", <URL: https://projects.preferred.jp/mn-core/en/>, Retrieved on Jul. 14, 2021.

Preferred Networks, Inc., "MN-Core Custom deep learning processor", <URL: https://www.preferred.jp/en/projects/mn-core/>, Retrieved on Aug. 16, 2021.

Yusuke Doi, Department of Computing Infrastructure, Preferred Networks Inc., "MN-Core: Massively SIMD Deep Learning Accelerator", Jun. 24, 2020, <https://www.youtube.com/watch?app=desktop&v=y83lZyQru74>.

Hiroya Kaneko, Preferred Networks Inc., "About MN-Core", Feb. 2, 2019, retrieved from <https://www.slideshare.net/slideshow/fpgax-11tfug-dnn20190202-mncore/130545446>.

* cited by examiner

FIG.6

| | | | |
|---|---|---|---|
| UNICAST INSTRUCTION | FROM BLK2 TO BLK1 | unicast: i, j, k | MOVE DATA AT ADDRESS j OF MEM2 TO ADDRESS k OF MEM1 IN ith BLK1 IN THE SAME BLK2 IN EACH BLK2 |
| | FROM BLK1 TO BLK2 | unicast: i, j, k | MOVE DATA AT ADDRESS j OF MEM1 IN ith BLK1 TO ADDRESS k OF MEM2 IN THE SAME BLK2 IN EACH BLK2 |
| MULTICAST INSTRUCTION | FROM BLK2 TO BLK2 | multicast 1 to 7 | COPY DATA IN MEM2 OF ONE BLK2 TO MEM2 IN ANOTHER SEVEN BLK2 IN EACH BLK3 |
| | | multicast 2 to 6 | COPY DATA IN MEM2 OF TWO BLK2 TO MEM2 IN ANOTHER SIX BLK2 IN EACH BLK3 |
| | | multicast 4 to 4 | COPY DATA IN MEM2 OF FOUR BLK2 TO MEM2 IN ANOTHER FOUR BLK2 IN EACH BLK3 |
| UNICAST INSTRUCTION | FROM BLK3 TO BLK2 | unicast: i, j, k | MOVE DATA AT ADDRESS j OF MEM3 TO ADDRESS k OF MEM2 IN ith BLK2 IN THE SAME BLK3 IN EACH BLK2 |
| | FROM BLK2 TO BLK3 | unicast: i, j, k | MOVE DATA AT ADDRESS j OF MEM2 IN ith BLK2 TO ADDRESS k OF MEM3 IN THE SAME BLK3 IN EACH BLK2 |

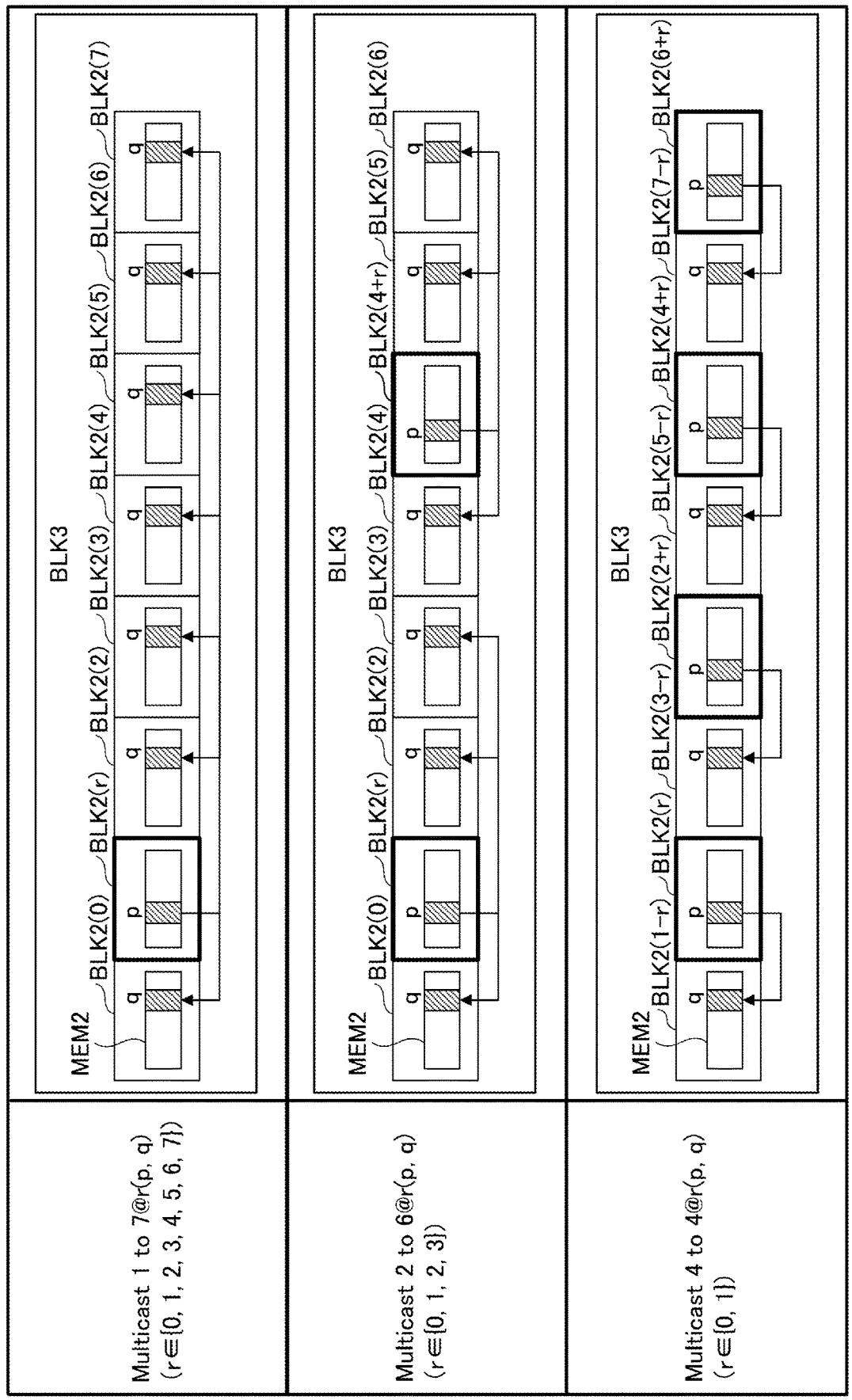

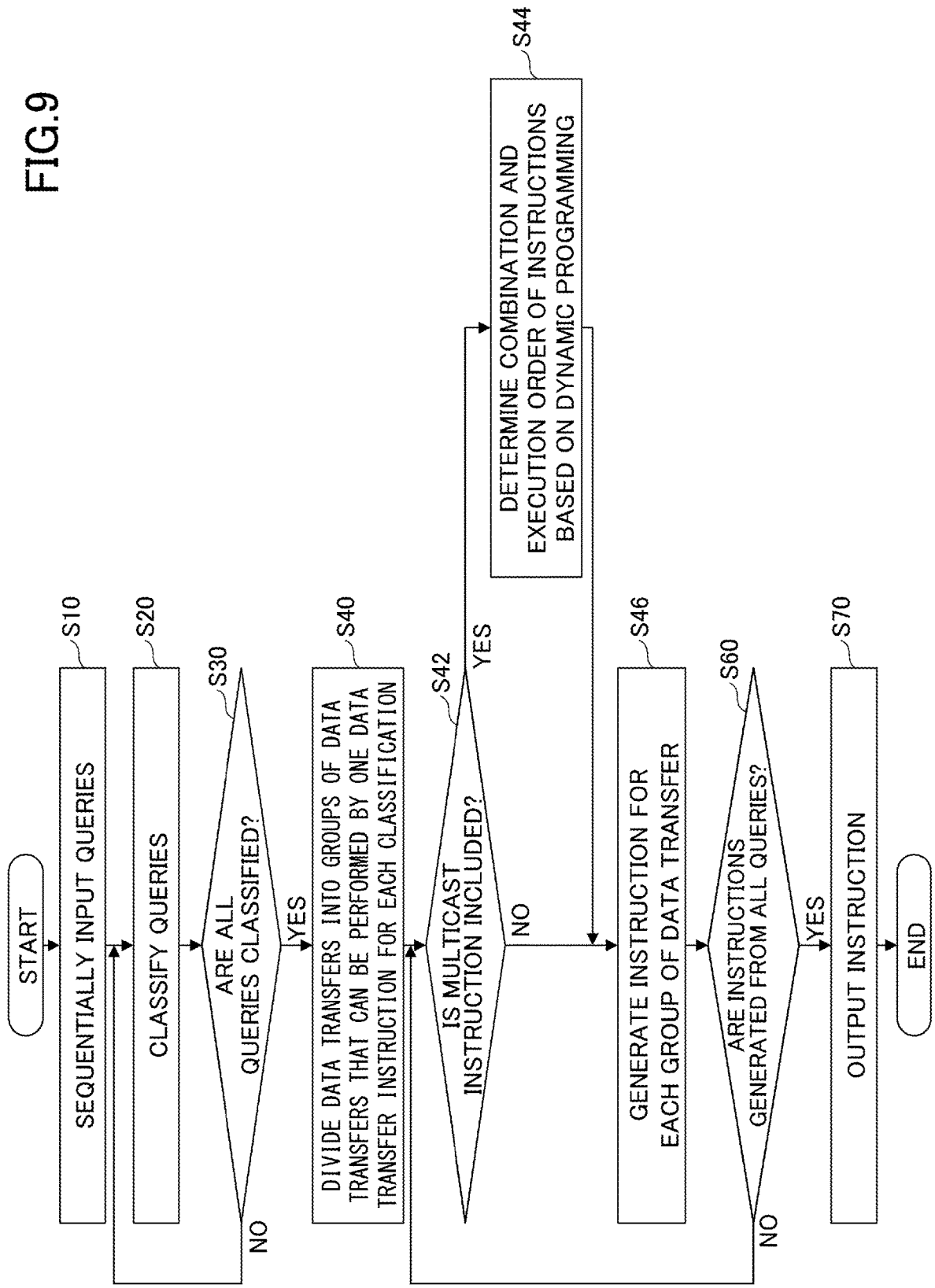

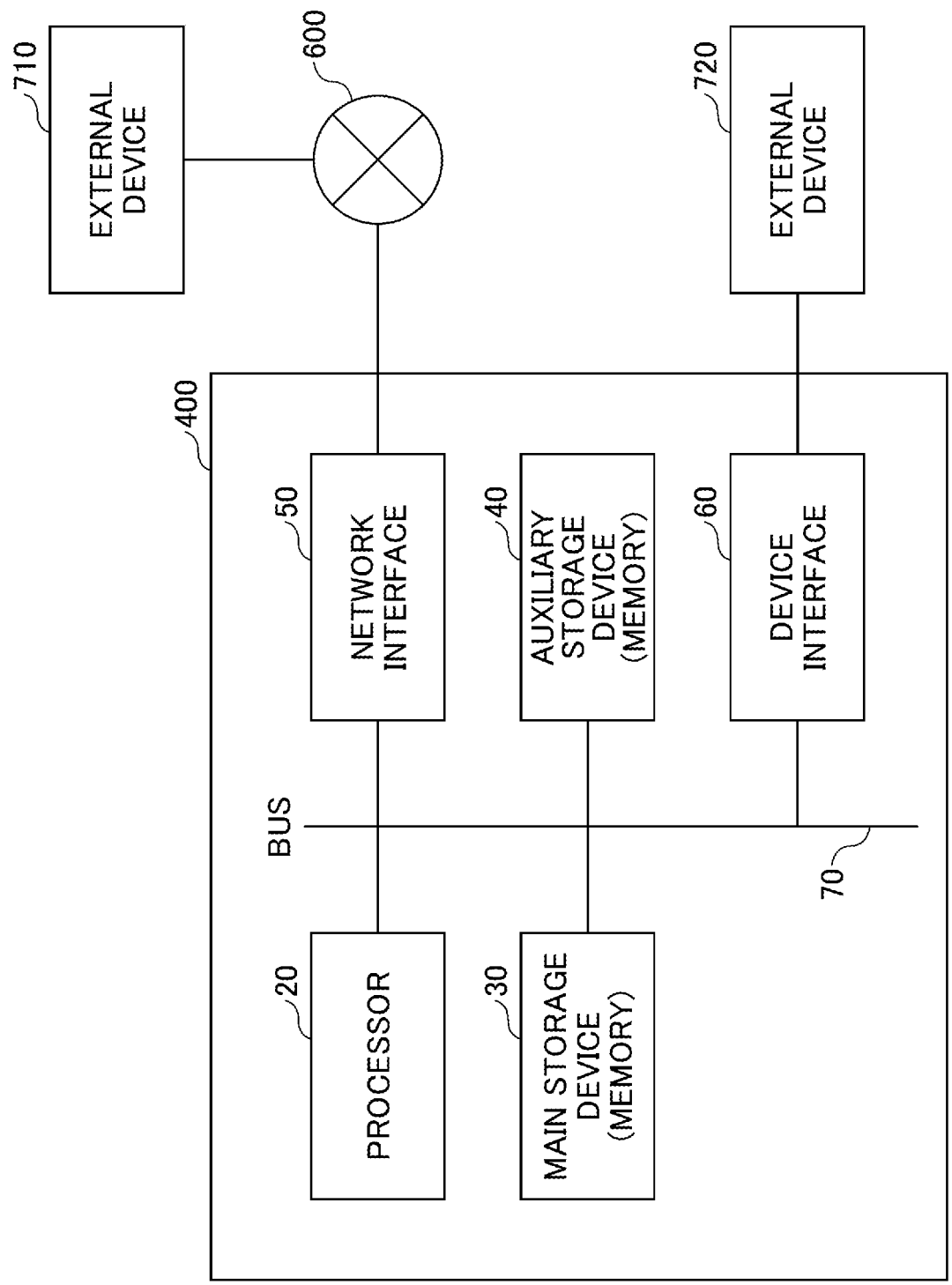

INSTRUCTION GENERATING METHOD, ARITHMETIC PROCESSING DEVICE, AND INSTRUCTION GENERATING DEVICE

CROSS-REFERENCE TO RELATED APPLICATIONS

This application is based upon and claims priority to Japanese Patent Application No. 2021-175277 filed on Oct. 27, 2021, the entire contents of which are incorporated herein by reference.

BACKGROUND

1. Technical Field

The present disclosure relates to an instruction generating method, an arithmetic processing device, and an instruction generating apparatus.

2. Description of the Related Art

Typically, deep learning is performed using a processor with a large number of cores inside, such as a graphics processing unit (GPU). In recent years, processors (accelerators) specialized for deep learning are developed to improve the calculation speed of deep learning. An architecture of the processor specialized for deep learning (the number of arithmetic units, the number of blocks including an arithmetic unit, the number of hierarchy levels of blocks, instructions, and the like) may differ from the architecture of a general-purpose product such as a GPU. Therefore, in order to efficiently operate the processor specialized for deep learning, an instruction generating device, such as a compiler, that appropriately generates instructions to be executed by the processor is important.

SUMMARY

According to one aspect of an embodiment, with respect to an instruction generating method of generating an instruction to be executed by an arithmetic processing device including a plurality of first blocks, each of the plurality of first blocks including a plurality of execution sections, the instruction generating method includes generating, by at least one processor, at least one data transfer instruction that causes the arithmetic processing device to perform at least one of a plurality of first data transfers, a plurality of second data transfers, a plurality of third data transfers, or a plurality of fourth data transfers. Transfer sources of the plurality of first data transfers are execution sections among the plurality of execution sections, transfer destinations of the plurality of first data transfers are execution sections among the plurality of execution sections, transfer sources of the plurality of second data transfers are first blocks among the plurality of first blocks, transfer destinations of the plurality of second data transfers are first blocks among the plurality of first blocks, transfer sources of the plurality of third data transfers are first blocks among the plurality of first blocks, transfer destinations of the plurality of third data transfers are execution sections among the plurality of execution sections, transfer sources of the plurality of fourth data transfers are execution sections among the plurality of execution sections, and transfer destinations of the plurality of fourth data transfers are first blocks among the plurality of first blocks.

BRIEF DESCRIPTION OF THE DRAWINGS

FIG. 6 is an explanatory diagram illustrating examples of data transfer instructions that can be executed by the arithmetic processing device of FIG. 5;

FIG. 7 is an explanatory diagram illustrating an example of data transfers performed by a multicast instruction of FIG. 6;

FIG. 9 is a flow diagram illustrating an example of an operation of the compiler implemented by the information processing device of FIG. 5; and FIG. 10 is a block diagram illustrating an example of a hardware configuration of the host and the information processing apparatus illustrated in FIG. 2 and FIG. 5.

DETAILED DESCRIPTION

In the following, embodiments of the present disclosure will now be described in detail with reference to the drawings.

Figure 1:
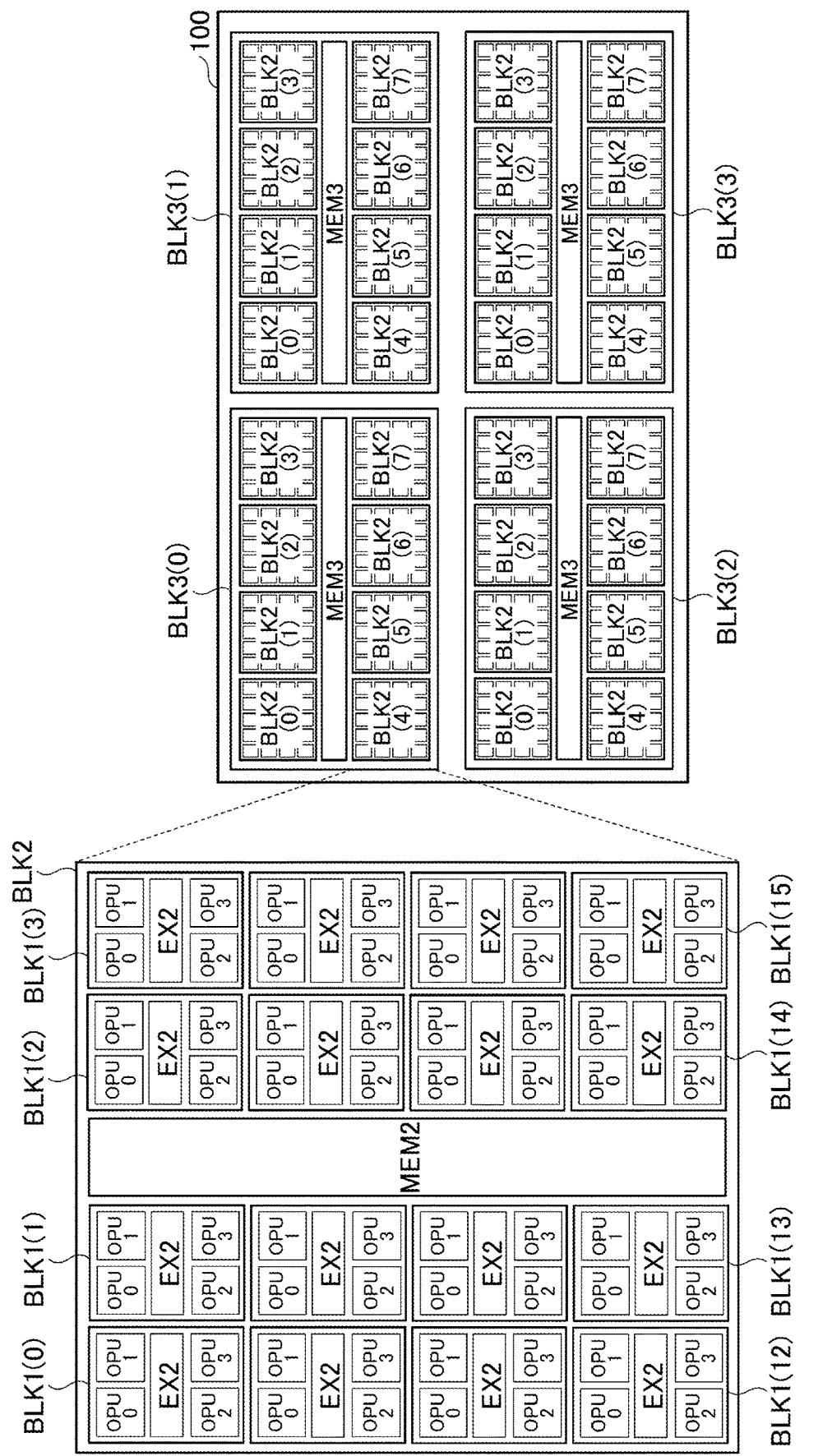
FIG. 1 is a block diagram illustrating an example of an arithmetic processing device according to an embodiment of the present disclosure.

FIG. 1 is a block diagram illustrating an example of an arithmetic processing device according to an embodiment of the present disclosure. For example, the arithmetic processing device 100 illustrated in FIG. 1 may function as an accelerator for executing deep learning. Here, the present disclosure may be applied to a processor such as an accelerator specialized in deep learning, or may be applied to another processor not specialized in deep learning.

The arithmetic processing device 100 as an example of a processor includes multiple first hierarchical blocks BLK1, multiple second hierarchical blocks BLK2 including the multiple first hierarchical blocks BLK1, and multiple third hierarchical blocks BLK3 including the multiple second hierarchical blocks BLK2. That is, the arithmetic processing device 100 includes the second hierarchical block BLK2 including a predetermined number of first hierarchical blocks BLK1 and the third hierarchical block BLK3 that are hierarchized. In the following description, when the first hierarchical block BLK1, the second hierarchical block BLK2, and the third hierarchical block BLK3 are described without distinction, they are simply referred to as a block BLK. The arithmetic processing device 100 can efficiently perform data transfers such as scatter, gather, broadcast, and contraction between the hierarchized blocks BLK by executing various data transfer instructions. Here, the number of hierarchies is an example, and the arithmetic processing device 100 may be configured with 4 or more hierarchy levels. Additionally, the block BLK in each hierarchy level may include at least either a memory or an arithmetic unit, and the arithmetic unit may perform a matrix operation.

The arithmetic processing device 100 may be in the form of a chip or a package such as a chip size package (CSP). The second hierarchical block BLK2 includes a memory MEM2, and the third hierarchical block BLK3 includes a memory MEM3. The first hierarchical block BLK1 is an example of the first block, and the second hierarchical blocks BLK2 and the third hierarchical blocks BLK3 are examples of the second block.

In the example illustrated in FIG. 1, the arithmetic processing device 100 includes four third hierarchical blocks BLK3. Each third hierarchical block BLK3 includes eight second hierarchical blocks BLK2. Each second hierarchical block BLK2 includes 16 first hierarchical blocks BLK1. However, the number of the third hierarchical blocks BLK3 mounted on the arithmetic processing device 100, the number of the second hierarchical blocks BLK2 mounted on the third hierarchical block BLK3, and the number of the first hierarchical blocks BLK1 mounted on the second hierarchical block BLK2 are not limited to FIG. 1. Here, the number of the third hierarchical blocks BLK3 mounted on the arithmetic processing device 100, the number of the second hierarchical blocks BLK2 mounted on the third hierarchical block BLK3, and the number of the first hierarchical blocks BLK1 mounted on the second hierarchical block BLK are preferably the nth power of 2 (n is an integer of 1 or greater), respectively.

Each first hierarchical block BLK1 includes an arithmetic unit EX2 and multiple operation processing units OPU. The operation processing unit OPU includes a memory MEM1 (FIG. 2) that stores data to be executed by the arithmetic unit EX2 and the arithmetic unit EX1 (FIG. 2), and supplies data to the arithmetic units EX1 and EX2 in accordance with instructions. For example, the arithmetic unit EX1 (FIG. 2) may be an integer arithmetic unit. The operation processing unit OPU is an example of an execution section. For example, each of the arithmetic units EX1 and EX2 can execute single instruction multiple data (SIMD) instructions. Because the multiple arithmetic units EX1 and the multiple arithmetic units EX2 can execute instructions in parallel, each arithmetic processing device 100 or board 200 (FIG. 2) can operate as a huge SIMD execution machine.

When the memories MEM1, MEM2, and MEM3 in respective blocks BLK are described without distinction, they are simply referred to as memories MEM. The memory MEM1 (FIG. 2) in each operation processing unit OPU mounted in the first hierarchical block BLK1 may be described as the memory of the first hierarchical block BLK1.

Figure 2:
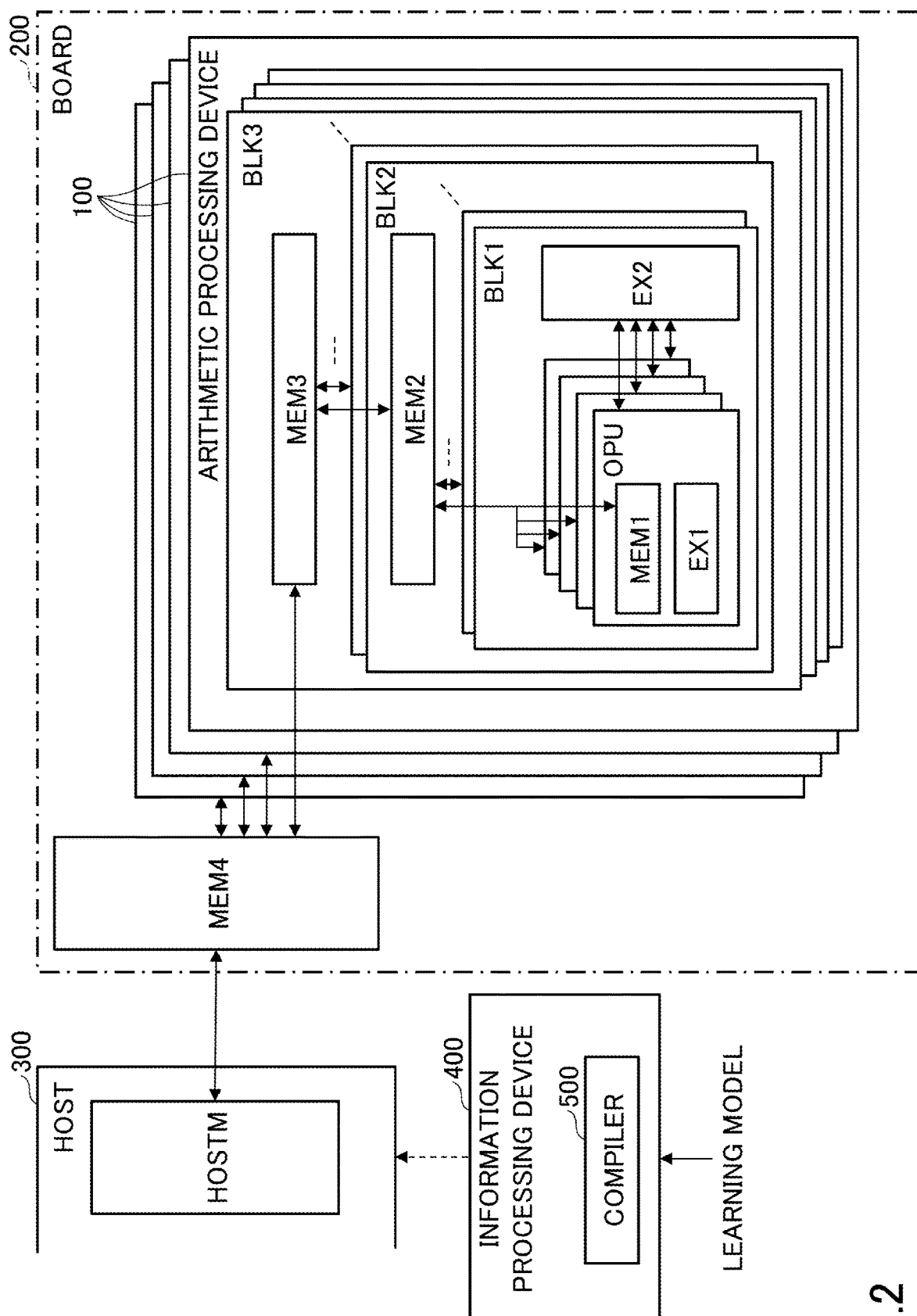
FIG. 2 is a block diagram illustrating an example of a system including a board on which the arithmetic processing devices of FIG. 1 are mounted and a host, and an information processing device that generates instructions to be executed by the arithmetic processing device.

FIG. 2 is a block diagram illustrating an example of a system including a board 200 on which the arithmetic processing devices 100 of FIG. 1 are mounted and a host 300, and an information processing device 400 that generates instructions to be executed by the arithmetic processing device 100. The board 200 illustrated in FIG. 2 includes multiple arithmetic processing devices 100 and a memory MEM4 that are connected to each other. For example, the board 200 may be in the form of a board on which the multiple arithmetic processing devices 100 and the memory MEM4 are mounted. Additionally, the multiple arithmetic processing devices 100 may be mounted on a multi-chip package. In this case, the multiple arithmetic processing devices 100 are preferably arranged on a substrate in order to improve heat dissipation.

In FIG. 2, the board 200 includes four arithmetic processing devices 100, but the number of the arithmetic processing devices 100 is not limited to four, and may be one or more. The memory MEM4 is provided in common to the four arithmetic processing devices 100, but may be provided to each arithmetic processing device 100. The board 200 including the multiple arithmetic processing devices 100 operates as one arithmetic processing device. If the board 200 includes the multiple arithmetic processing devices 100, each arithmetic processing device 100 or the board 200 may function as a second block at a highest level.

In each arithmetic processing device 100, the memory MEM3 of each third hierarchical block BLK3 is connected to the memory MEM4 and the memory MEM2 of each second hierarchical block BLK2 in the third hierarchical block BLK3, and data can be mutually transferred. Additionally, a data transfer instruction and an arithmetic instruction may be transferred from the memory MEM4 to each memory MEM3 and from the memory MEM3 to each memory MEM2.

The memory MEM2 is connected to the memory MEM1 mounted on each operation processing unit OPU in the second hierarchical block BLK2, and data can be mutually transferred. A data transfer instruction and an arithmetic instruction may be transferred from the memory MEM2 to each memory MEM1. Each first hierarchical block BLK1 and each operation processing unit OPU may include a register.

Data can be mutually transferred between the memory MEM4 and a host memory HOSTM mounted on the host 300. A data transfer instruction and an arithmetic instruction may be transferred from the host memory HOSTM to the memory MEM4. Here, in addition to a data transfer path illustrated in FIG. 2, a transfer path for transferring a data transfer instruction and an arithmetic instruction from the memory MEM4 to each memory MEM3, from the memory MEM3 to each memory MEM2, and from the memory MEM2 to each memory MEM1 (not illustrated) may be provided.

The host memory HOSTM and the memory MEM4 may, for example, transmit and receive information such as data and instructions via a peripheral component interconnect express (PCIe) interface. The information transfer between the host memory HOSTM and the memory MEM4 may be performed by direct memory access (DMA).

Each arithmetic processing device 100 of the board 200 executes arithmetic processing by using data received from the host 300 based on instructions (a data transfer instruction and an arithmetic instruction) received from the host 300. Various instructions transmitted from the host 300 to the arithmetic processing device 100 are generated by the information processing device 400, are transferred from the information processing device 400 to the host 300, and are stored in the host memory HOSTM. The information processing device 400 may be, for example, a server.

The information processing device 400 functions as a compiler 500 (a code generator) that generates an instruction sequence to be executed by the arithmetic processing device 100 by a processor such as a built-in central processing unit (CPU) executing a program. For example, the processor of the information processing device 400 executes an instruction generation program stored in a memory mounted on the information processing device 400 to perform an instruction generation method and then generates an instruction sequence. The information processing device 400 is an example of an instruction generating device. The dashed arrow between the information processing device 400 and the host 300 indicates that the instruction sequence generated by the compiler 500 is transferred to the host 300. Here, the instruction sequence may be transferred via a network.

For example, the compiler 500 generates instructions (instruction codes) that cause the board 200 to execute deep learning. At this time, for example, the compiler 500 generates an instruction sequence that causes the board 200 to efficiently execute deep learning based on a learning model generated using a general-purpose library (a framework) for deep learning. For example, the compiler 500 divides a query sequence instructing data movement from a transfer source to a transfer destination into groups of multiple queries that can be processed simultaneously, and generates instruction codes or the like indicating one or more data transfer instructions for each of the groups of multiple queries. This can improve the calculation speed of the deep learning of the board 200, and the calculation time required for the deep learning can be shortened. Although not particularly limited, for example, the instruction codes may be machine code obtained by assembling a description in an assembly language.

Figure 3:
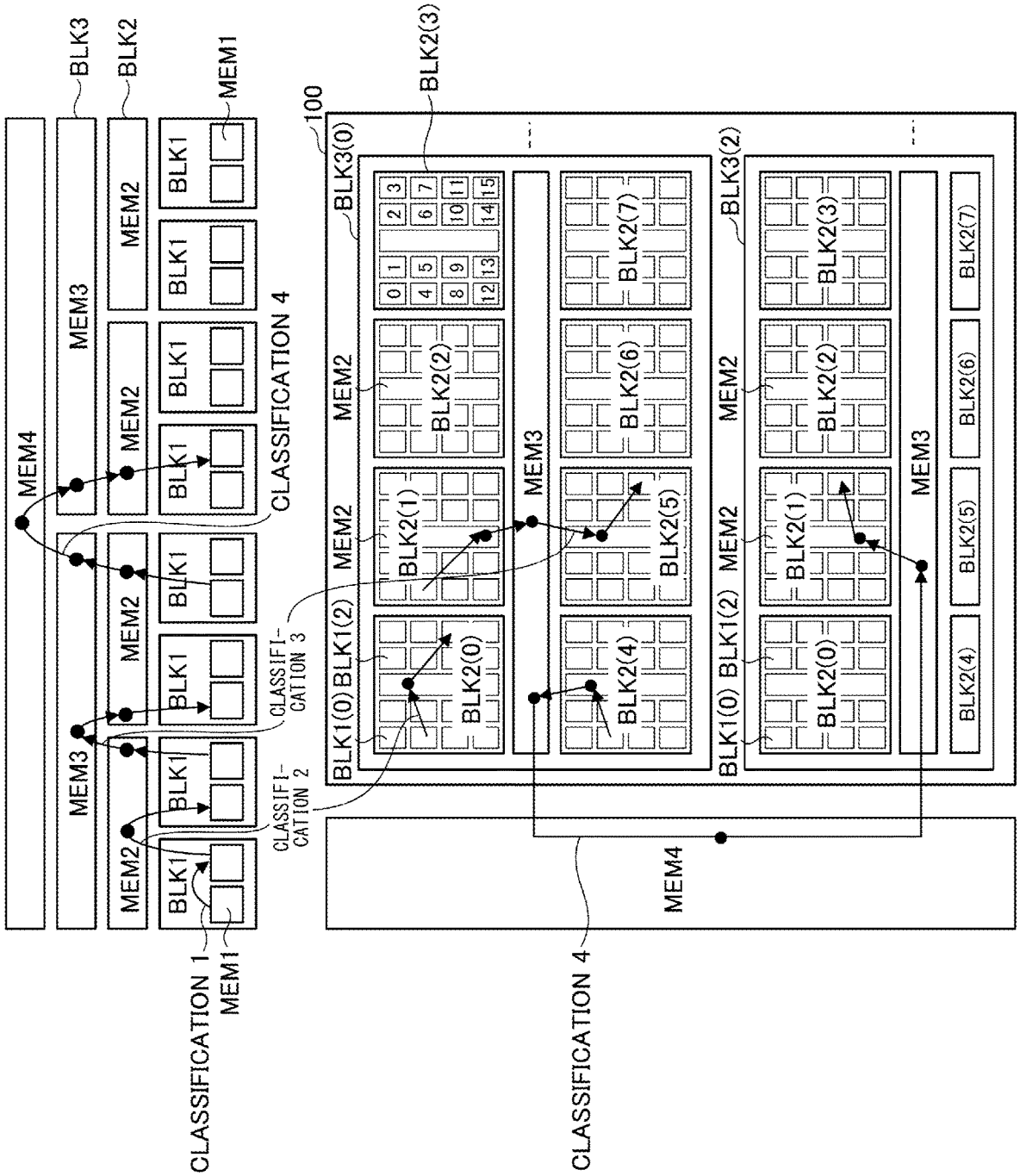
FIG. 3 is an explanatory diagram illustrating an example of data transfer classifications according to a data transfer path.

FIG. 3 is an explanatory diagram illustrating an example of data transfer classification according to a data transfer path. The data transfer instruction generated by the compiler 500 of FIG. 2 includes an instruction that causes data to move between blocks BLK adjacent in the hierarchy. The arrow illustrated in FIG. 3 indicates a path of data transfer performed by the data transfer instruction. For example, the data transfer indicated by a single arrow is implemented by one or more data transfer instructions. The black circle illustrated in FIG. 3 indicates that the data passes through the memory MEM during the data transfer. In a plan view of the arithmetic processing device 100 illustrated in FIG. 3, the numerical values illustrated in 16 first hierarchical blocks BLK1 in one of the second hierarchical blocks BLK2 indicate identifiers of the first hierarchical block BLK1. The same identifiers are also assigned to 16 first hierarchical blocks BLK1 of another second hierarchical block BLK2 that does not indicate the numerical values. Here, the identifiers of the first hierarchical blocks BLK1 may be assigned with mirror symmetry.

Although not illustrated, identifiers numbered from 0 to 3 are sequentially assigned to four operation processing units OPU in each of the first hierarchical blocks BLK1 as illustrated in FIG. 1. Identifiers numbered from 0 to 7 are also sequentially assigned to eight second hierarchical blocks BLK2 in each of the third hierarchical blocks BLK3. Identifiers numbered from 0 to 3 are also sequentially assigned to four third hierarchical blocks BLK3 in each of the arithmetic processing devices 100. Furthermore, identifiers numbered from 0 to 3 are sequentially assigned to the four arithmetic processing devices 100 in the board 200.

Here, the identifier assigned to each element is an example, and is not limited to a number as long as the identifier can identify each element. For example, an address that can identify the position of each element may be used as the identifier. The address may be a memory address. A register number may be used as the identifier.

As the data transfer executed by the data transfer instruction, there is a data transfer between the operation processing units OPU in the first hierarchical block BLK1. Additionally, as the data transfer executed by the data transfer instruction, there is a data transfer between the first hierarchical blocks BLK1 in the second hierarchical block BLK2 and data transfer between the second hierarchical blocks BLK2 in the third hierarchical block BLK3. Further, as the data transfer executed by the data transfer instruction, there is a data transfer between the third hierarchical blocks BLK3 in the arithmetic processing device 100.

By combining these data transfers, the data transfers illustrated in the classifications 1 to 4 are achieved. Here, the data transfers in the classifications 1 to 4 are examples. For example, if the number of hierarchies of blocks increases, the number of classifications also increases. Additionally, in FIG. 3, for the purpose of simplifying the description, although one data transfer corresponding to each of the classifications 1 to 4 is illustrated, each of the arithmetic processing devices 100 can actually perform multiple data transfers for each classification. Respective data transfers in the classification 1 to the classification 4 correspond to queries used to move data of the memory MEM, to which one address is assigned, to the memory MEM, to which another address is assigned, between the operation processing units OPU or the first hierarchical blocks BLK1. The classification 1 is a data transfer between the operation processing units OPU (the memories MEM1 or registers) in the first hierarchical block BLK1, and the data does not pass through the memories MEM2, MEM3, and MEM4.

The classification 2 is a data transfer between the first hierarchical blocks BLK1 in the second hierarchical block BLK2, and the number of hierarchical levels of the blocks BLK through which data is passed is one (the second hierarchical block BLK2). The classification 3 is a data transfer between the first hierarchical blocks BLK1 belonging to the different second hierarchical blocks BLK2 in the third hierarchical block BLK3, and the number of hierarchical levels of the blocks BLK through which data is passed is two (the second hierarchical block BLK2 and the third hierarchical block BLK3).

The classification 4 is a data transfer between the first hierarchical blocks BLK1 belonging to the different third hierarchical blocks BLK3 in the arithmetic processing device 100, and the number of hierarchical levels of the blocks BLK through which data is passed is three (the second hierarchical block BLK2, the third hierarchical block BLK3, and the arithmetic processing device 100 (the memory MEM4)). Here, each of the four arithmetic processing devices 100 in the board 200 can perform the data transfers in the classifications 1 to 4 independently of the other three arithmetic processing devices 100.

For example, the compiler 500 can generate at least one data transfer instruction for commonly executing multiple data transfers in which the identifiers of the data transfer sources are identical to each other and the identifiers of the data transfer destinations are identical to each other. For example, a data transfer instruction may be generated for each of the data transfers of the classifications 1 to 4. By generating the data transfer instruction for each classification, the data transfers for passing through substantially the same paths can be easily grouped, and at least one data transfer instruction for commonly executing multiple data transfers can be easily generated. Here, the data transfer instruction may be generated for a data transfer in at least one of the data transfer paths included in the classifications 2 to 4.

Additionally, in each of the data transfer instructions, the compiler 500 may add, to the data transfer instruction, mask information (option information) for disabling to store the data in at least one of the transfer destinations (the memory MEM1, MEM2, MEM3, MEM4, or the storage unit such as the register). This can prevent the data from being written to the transfer destination specified by the mask information. In other words, among multiple data transfers that can be executed by one data transfer instruction, the writing of the data to a selected transfer destination can be performed. Here, the masking (disabling) of the data transfer based on the mask information may be performed by masking (disabling) the reading of the data from the transfer source.

For example, in the classification 1, a data transfer between a pair of operation processing units OPU in each of 512 first hierarchical blocks BLK1 of the arithmetic processing device 100 can be simultaneously performed by at least one data transfer instruction. The multiple data transfers included in the classification 1 can be performed by at least one common data transfer instruction when the identifiers of the operation processing units OPU of the data transfer sources are identical to each other and the identifiers of the operation processing units OPU of the data transfer destinations are identical to each other. Here, the identity of the identifiers in the classification 1 may be determined using not only the identifier assigned to the operation processing unit OPU but also the identifier of the register in the operation processing unit OPU or the identifier of the memory MEM1.

Here, the data transfer instruction for performing the data transfer of the classification 1 can mask the storing of the data in the operation processing unit OPU of the data transfer destination with the mask information added to the data transfer instruction. This can perform the data transfer between given operation processing units OPU, even when an address indicating the data transfer source and an address indicating the data transfer destination are specified by the data transfer instruction. For example, each data transfer of the classification 1 may be performed by a unicast instruction for transferring data from one transfer source to one transfer destination.

In the classification 2, a data transfer from one first hierarchical block BLK1 to another first hierarchical block BLK1 in each of the 32 second hierarchical blocks BLK2 of the arithmetic processing device 100 can be simultaneously performed by at least one data transfer instruction. For example, in the classification 2, a data transfer in which the identifiers of the data transfer sources are identical to each other and the identifiers of the data transfer destinations are identical to each other can be performed by at least one common data transfer instruction (for example, a multicast instruction). For example, each of the data transfers of the classification 2 may be performed by the unicast instruction or may be performed by the combination of the unicast instruction and the multicast instruction.

In the classification 2, the identity of the identifiers of the transfer sources may be determined when the identifiers of the operation processing units OPU and the first hierarchical blocks BLK1 of the data transfer sources are identical. Similarly, in the classification 2, the identity of the identifiers of the data transfer destinations may be determined when the identifiers of the operation processing units OPU and the first hierarchical blocks BLK1 of the data transfer destinations are identical. Here, the identity of the identifier in the classification 2 may be determined by using the identifier of the register in the operation processing unit OPU, the identifier of the memory MEM1, or the identifier of the memory MEM2 in addition to the above.

In the classification 3, data transfers between the first hierarchical blocks BLK1 and the second hierarchical blocks BLK2 can be simultaneously performed by at least one data transfer instruction (for example, the unicast instruction). Additionally, in the classification 3, a data transfer between the second hierarchical blocks BLK2 in each of the four third hierarchical blocks BLK3 of the arithmetic processing device 100 can be simultaneously performed by at least one data transfer instruction (for example, the multicast instruction). For example, multiple types of multicast instructions are prepared in accordance with the number of transfer sources and the number of transfer destinations. Instructions such as the unicast instruction and the multicast instruction will be also described with reference to FIG. 6 and FIG. 7. For example, in the classification 3, data transfers in which the identifiers of the data transfer sources are identical to each other and the identifiers of the data transfer destinations are identical to each other can be performed by at least one common data transfer instruction.

In the classification 3, the identity of the identifiers of the transfer sources of the data transfers between the first hierarchical blocks BLK1 and the second hierarchical blocks BLK2 may be determined when the respective identifiers of the operation processing units OPU, the first hierarchical blocks BLK1, and the second hierarchical blocks BLK2 of the data transfer sources are identical. Similarly, in the classification 3, the identity of the identifiers of the data transfer destinations of the data transfers between the first hierarchical blocks BLK1 and the second hierarchical blocks BLK2 may be determined when the respective identifiers of the operation processing units OPU, the first hierarchical blocks BLK1, and the second hierarchical blocks BLK2 of the data transfer destinations are identical.

Additionally, in the classification 3, the identity of the identifiers of the transfer sources of the data transfers between the second hierarchical blocks BLK2 may be determined when the identifiers of the second hierarchical blocks BLK2 of the data transfer sources are identical to each other. Similarly, in the classification 3, the identity of the identifiers of the transfer destinations of the data transfers between the second hierarchical blocks BLK2 may be determined when the identifiers of the second hierarchical blocks BLK2 of the data transfer destinations are identical to each other. Here, the identity of the identifiers in the classification 3 may be determined by using the identifier of the register in the operation processing unit OPU, the identifier of the memory MEM1, the identifier of the memory MEM2, or the identifier of the memory MEM3.

In the classification 4, data transfers between the first hierarchical blocks BLK1 and the second hierarchical blocks BLK2 can be simultaneously performed by at least one data transfer instruction (for example, the unicast instruction), as in the classification 3. In the classification 4, data transfers between the second hierarchical blocks BLK2 and the third hierarchical blocks BLK3 can be simultaneously performed by at least one data transfer instruction (for example, the unicast instruction). Additionally, in the classification 4, data transfers between different third hierarchical blocks BLK3 in the arithmetic processing device 100 can be simultaneously performed by at least one data transfer instruction (for example, the multicast instruction).

In the classification 4, the identity of the identifiers of the transfer sources of the data transfers between the first hierarchical blocks BLK1 and the second hierarchical blocks BLK2 may be determined when the respective identifiers of the operation processing units OPU, the first hierarchical blocks BLK1, and the second hierarchical blocks BLK2 of the data transfer sources are identical to each other as in the classification 3. Similarly, in the classification 4, the identity of the identifiers of the transfer destinations of the data transfers between the first hierarchical blocks BLK1 and the second hierarchical blocks BLK2 may be determined when the respective identifiers of the operation processing units OPU, the first hierarchical blocks BLK1, and the second hierarchical blocks BLK2 of the data transfer destinations are identical to each other.

In the classification 4, the identity of the identifiers of the transfer sources of the data transfers between the second hierarchical blocks BLK2 and the third hierarchical blocks BLK3 may be determined when the respective identifiers of the second hierarchical blocks BLK2 and the third hierarchical blocks BLK3 are identical to each other. Similarly, in the classification 4, the identity of the identifiers of the transfer destinations of the data transfers between the second hierarchical blocks BLK2 and the third hierarchical blocks BLK3 may be determined when the respective identifiers of the second hierarchical blocks BLK2 and the third hierarchical blocks BLK3 are identical to each other.

Additionally, in the classification 4, the identity of the identifiers of the transfer sources of the data transfers between the third hierarchical blocks BLK3 may be determined when the identifiers of the third hierarchical blocks BLK3 of the data transfer sources are identical to each other. Similarly, in the classification 4, the identity of the identifiers of the transfer destinations of the data transfers between the third hierarchical blocks BLK3 may be determined when the identifiers of the third hierarchical blocks BLK3 of the data transfer destinations are identical to each other. Here, the identity of the identifiers in the classification 4 may be determined by using the identifier of the register in the operation processing unit OPU, the identifier of the memory MEM1, the identifier of the memory MEM2, or the identifier of the memory MEM3.

The data transferred by the data transfers from the classification 2 to the classification 4 are output from the operation processing unit OPU and input to another operation processing unit OPU. Therefore, as described in the classification 1, by masking the storing of the data in the operation processing unit OPU of the data transfer destination, a part of the data transfers performed by one data transfer instruction for each classification can be invalidated.

Here, the data transfer may be performed without classification. For example, in the data transfers of the classification 2, the classification 3, and the classification 4 illustrated in FIG. 3, the identifiers of the first hierarchical blocks BLK1 of the data transfer sources are "4". Here, the identifier may be an identifier including a register number of the register in the first hierarchical block BLK1. In this case, the data transfers from the first hierarchical blocks BLK1 to the second hierarchical blocks BLK2 (the memories MEM2) may be performed by one data transfer instruction. Additionally, in the data transfers of the classification 3 and the classification 4 illustrated in FIG. 3, the identifiers of the first hierarchical blocks BLK1 of the data transfer destinations are "11". Here, the identifier may be an identifier including a register number of the register in the first hierarchical block BLK1. In this case, the data transfers from the second hierarchical blocks BLK2 (the memories MEM2) to the first hierarchical blocks BLK1 may be performed by one data transfer instruction. As described, multiple data transfer instructions having the same identifiers of the transfer sources and the transfer destinations may be performed by at least one common data transfer instruction, regardless of the classification.

Figure 4:
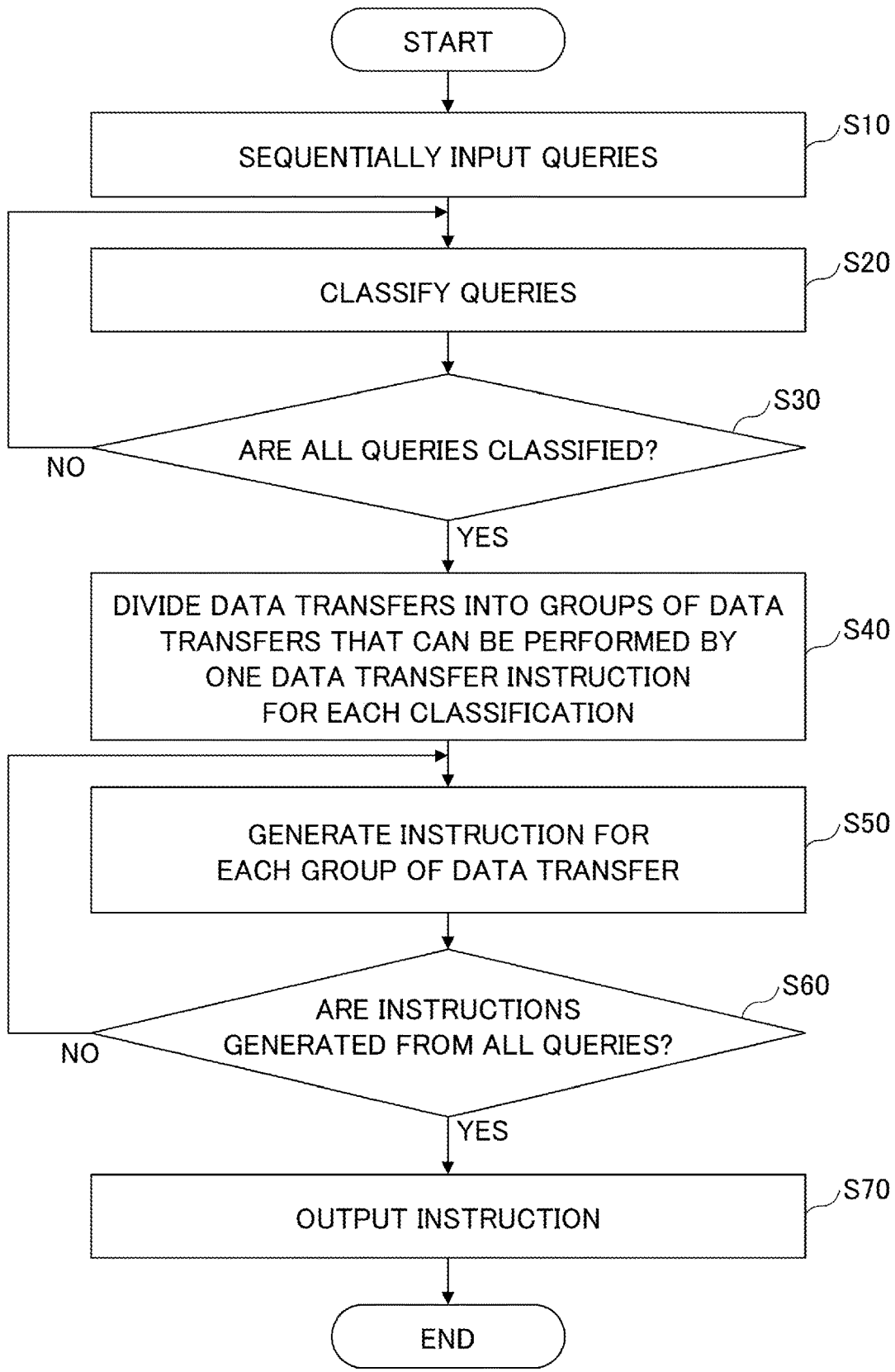
FIG. 4 is a flow diagram illustrating an example of an operation of a compiler implemented by the information processing device of FIG. 2.

FIG. 4 is a flow diagram illustrating an example of an operation of the compiler 500 of FIG. 2. That is, the flow illustrated in FIG. 4 indicates an example of an instruction generation method performed by the compiler 500 implemented by the CPU or the like of the information processing device 400 executing an instruction generation program.

First, in step S10, the compiler 500 sequentially inputs multiple queries for causing the board 200 to execute deep learning from the outside. Next, in step S20, the compiler 500 classifies each of the input queries into one of the classifications from the classification 1 to the classification 4. Next, in step S30, if all the input queries are classified, the compiler 500 performs step S40, and if any unclassified queries remain, the processing returns to step S20.

In step S40, the compiler 500 divides the data transfers into groups of the data transfers that can be performed by one data transfer instruction for each classification. That is, the group corresponds to one data transfer instruction. This can generate at least one common data transfer instruction that can transfer multiple data in parallel for each group. At this time, the compiler 500 divides the data transfers between the blocks BLK adjacent to each other in the hierarchy illustrated in FIG. 3 into at least one group for each classification. For example, in the classification 3, the compiler 500 divides the data transfers into at least one group for each of the data transfer between the first hierarchical block BLK1 and the second hierarchical block BLK2 and the data transfer between the second hierarchical block BLK2 and the third hierarchical block BLK3.

Next, in step S50, the compiler 500 generates a data transfer instruction for each group of the data transfers divided in step S40. For example, the data transfer instruction generated by the compiler 500 for each group includes any one of multiple types of unicast instructions for transferring data to a single destination or any one of multiple types of multicast instructions for transferring data to multiple destinations. By combining the unicast instructions or multicast instructions generated for each group, for example, the compiler 500 can perform the data transfer between the blocks BLK adjacent to each other in the hierarchy with the minimum number of data transfer instructions.

Here, for example, when data transfers between two blocks BLK adjacent to each other in the hierarchy can be performed by using multiple types of multicast instructions, the compiler 500 may use dynamic programming to determine the combination and execution order of multicast instructions having a small number of instructions for at least a part of the data transfers between the blocks BLK. Here, the dynamic programming includes a method of recursively dividing a target problem into multiple subproblems and solving the target problem while reusing calculation results of the divided subproblems. Additionally, if the data transfer between two blocks BLK adjacent to each other in the hierarchy can be performed by using at least one of the multiple types of unicast instructions, the compiler 500 generates a unicast instruction to be executed after the multiple types of multicast instructions. Here, the arithmetic processing device 100 executes data transfer instructions generated by the compiler 500 and transmitted from the host 300 in the order generated by the compiler 500.

Next, in step S60, the compiler 500 performs step S70 if instructions are generated from all the queries, and returns to step S50 if a query from which an instruction is not generated remains. In step S70, the compiler 500 outputs the instructions generated in step S50 in the order of generation, and ends the operation illustrated in FIG. 4.

As described above, in the present embodiment, the compiler 500 can generate at least one data transfer instruction for executing, in parallel, multiple data transfers among the data transfers included in the multiple queries for each of the classifications obtained in accordance with the number of hierarchy levels of the blocks BLK through which the data is passed. Thus, in the arithmetic processing device 100 in which the blocks BLK including the operation processing units OPU are hierarchized, a large amount of data can be moved between the blocks BLK by a smaller number of data transfer instructions than the number of data transfer instructions in the conventional method. That is, the compiler 500 can generate a data transfer instruction that enables data transfer to be performed at a lower cost than in the conventional method in accordance with the architecture of the board 200 and the arithmetic processing device 100. As a result, the calculation time required for deep learning performed by the arithmetic processing device 100 or the board 200 can be shortened.

For example, in the data transfers of the classification 3 illustrated in FIG. 3, the arithmetic processing device 100 can perform each of the multiple data transfers from the first hierarchical block BLK1 to the second hierarchical block BLK2 and the multiple data transfers from the second hierarchical block BLK2 to the first hierarchical block BLK1 with a minimum number of the instructions. In the data transfers of the classification 3, the arithmetic processing device 100 can perform the multiple data transfers between the second hierarchical blocks BLK2 via the third hierarchical block BLK3 with a minimum number of the instructions.

With respect to the above, for example, in the data transfers of the classification 3, when the data transfers are performed between the two first hierarchical blocks BLK1 in the third hierarchical block BLK3 without grouping the queries, each data transfer is performed by using four data transfer instructions. The four data transfer instructions are instructions for transferring data from the first hierarchical block BLK1 to the second hierarchical block BLK2, from the second hierarchical block BLK2 to the third hierarchical block BLK3, from the third hierarchical block BLK3 to the second hierarchical block BLK2, and from the second hierarchical block BLK2 to the first hierarchical block BLK1. In this case, four instructions are required for the data transfers of the classification 3 in each of the third hierarchical blocks BLK3.

Each arithmetic processing device 100 includes four third hierarchical blocks BLK3, and the board 200 includes 16 third hierarchical blocks BLK3. Thus, when the data transfers of the classification 3 are performed without grouping the queries, 16 instructions are required in each arithmetic processing device 100, and 64 instructions are required in the board 200 including 4 arithmetic processing devices 100. In the present embodiment, each arithmetic processing device 100 and the board 200 can perform multiple data transfers in parallel for each data transfer instruction by using at least one common data transfer instruction for each group. At this time, each arithmetic processing device 100 may issue a SIMD type data transfer instruction to each of the first hierarchical block BLK1 and the second hierarchical block BLK2. In this case, a large number of data transfers can be performed in parallel with a smaller number of instructions in comparison with a case of respectively issuing individual data transfer instructions to the first hierarchical blocks BLK1 and the second hierarchical blocks BLK2. For example, in the entirety of the board 200, the data transfers of the classification 3 can be performed by four instructions. This is approximately 6% of 64 instructions used when the data transfers of the classification 3 are performed in the entirety of the board 200. Here, a part of the multiple data transfers performed by one data transfer instruction may be masked (invalidated) using mask information.

Figure 5:
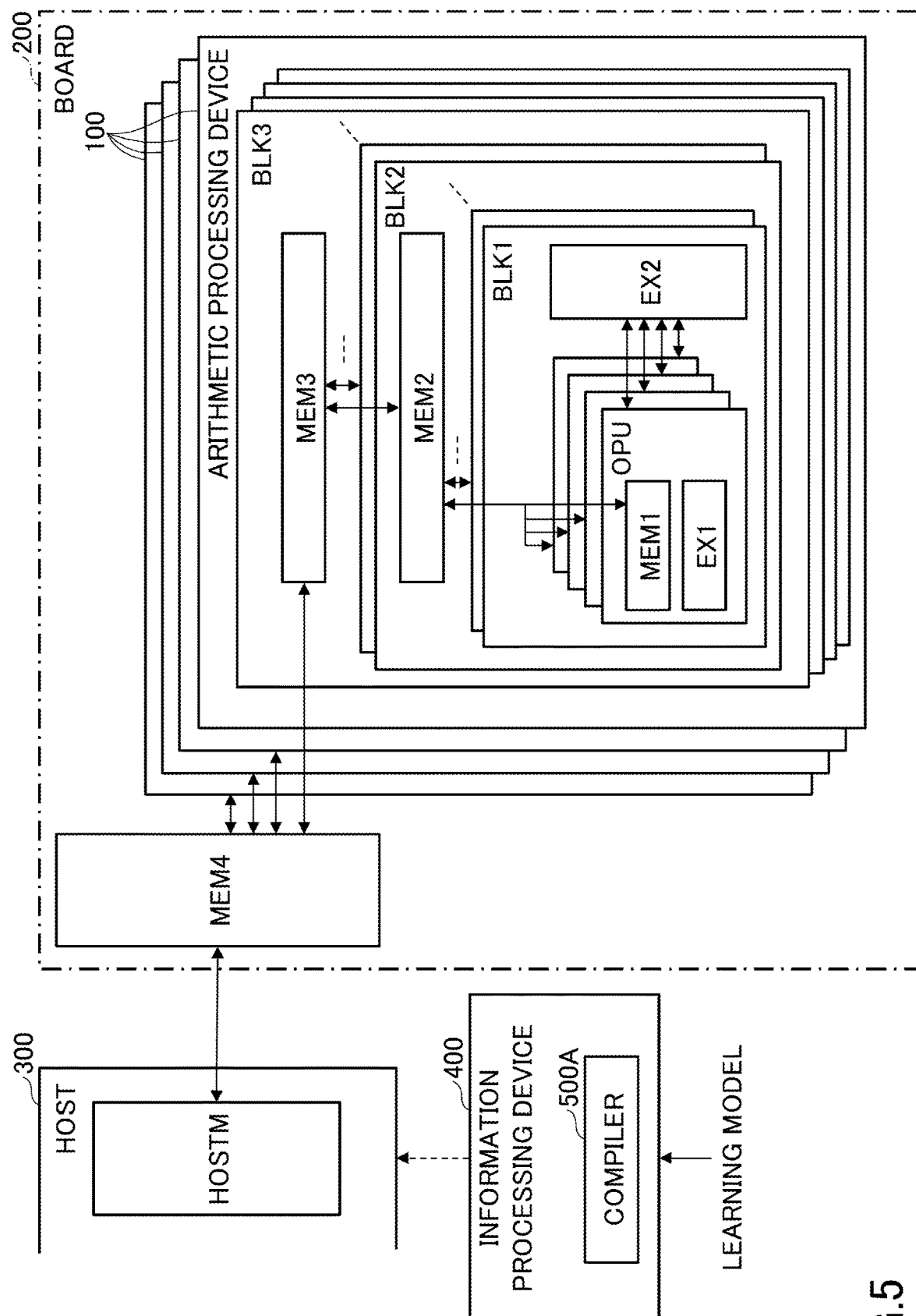
FIG. 5 is a block diagram illustrating an example of a system including a board and a host according to another embodiment, and an information processing device that generates instructions to be executed by an arithmetic processing device.

FIG. 5 is a block diagram illustrating an example of a system including the board 200 and the host 300 according to another embodiment, and the information processing device 400 that generates instructions to be executed by the arithmetic processing device 100. The configuration of the system including the board 200 and the host 300 is substantially the same as that of FIG. 2. The information processing device 400 functions as a compiler 500A (a code generator) that generates an instruction sequence to be executed by the arithmetic processing device 100, by a built-in processor such as a CPU executing a program.

As in FIG. 2, the compiler 500A generates instructions (instruction codes) that cause the board 200 to execute deep learning. At this time, the compiler 500A uses dynamic programming to determine a part of multiple data transfer instructions to be executed by the board 200. For example, the compiler 500A uses dynamic programming to determine the combination and execution order of multicast instructions that reduce the number of instructions for at least a part of data transfers between two blocks BLK adjacent in the hierarchy. By using dynamic programming, unnecessary combinations of the data transfer instructions can be eliminated from the combinations of the data transfer instructions that exponentially increase as the scale of data transfers increases, so that a combination that minimizes the number of data transfer instructions can be determined within an acceptable time frame. Additionally, by using dynamic programming, the combination of data transfer instructions having a small number of instructions can be found, so that the calculation speed of deep learning performed by the board 200 can be improved, and the calculation time required for deep learning can be shortened.

FIG. 6 is an explanatory diagram illustrating an example of data transfer instructions that can be executed by the arithmetic processing device 100 of FIG. 5. FIG. 6 illustrates data transfer instructions between the second hierarchical block BLK2 and the first hierarchical block BLK1, data transfer instructions between the second hierarchical blocks BLK2 via the third hierarchical block BLK3, and data transfer instructions between the second hierarchical block BLK2 and the third hierarchical block BLK3. Here, the data transfer instructions that can be executed by the arithmetic processing device 100 are not limited to the instructions illustrated in FIG. 6. A data transfer instruction between the second hierarchical block BLK2 and the first hierarchical block BLK1 is supplied to the second hierarchical block BLK2, and a data transfer instruction between the second hierarchical block BLK2 and the third hierarchical block BLK3 is supplied to the third hierarchical block BLK3, for example.

The data transfer instructions between the second hierarchical block BLK2 and the first hierarchical block BLK1 include a unicast instruction. In the unicast instruction, in each of the second hierarchical blocks BLK2, data in the memory MEM2 or the memory MEM1 is moved. Here, the movement of the data indicates a copy of the data, and the original data remains as long as the data is not overwritten.

The data transfer instructions between the second hierarchical blocks BLK2 include three types of multicast instructions. In the data transfer instructions between the second hierarchical blocks BLK2, data is moved via the third hierarchical block BLK3. The movement of the data performed by the multicast instruction will be described with reference to FIG. 4. The data transfer instructions between the second hierarchical block BLK2 and the third hierarchical block BLK3 include a unicast instruction. In the unicast instruction for moving data from the third hierarchical block BLK3 to the second hierarchical block BLK2, in each of the third hierarchical blocks BLK3, the data is moved from the memory MEM3 of the third hierarchical block BLK3 to the memory MEM2 of the second hierarchical block BLK2. In the unicast instruction for moving data from the second hierarchical block BLK2 to the third hierarchical block BLK3, in each of the third hierarchical blocks BLK3, the data is moved from the memory MEM2 of the second hierarchical block BLK2 to the memory MEM3 of the third hierarchical block BLK3.

Similar to the above-described embodiment, each instruction illustrated in FIG. 6 can move data in parallel in the multiple first hierarchical blocks BLK1, the multiple second hierarchical blocks BLK2, or the multiple third hierarchical blocks BLK3 by using a source address, a destination address, or a relative address. Therefore, the arithmetic processing device 100 can move a large amount of data in parallel by executing one of the instructions illustrated in FIG. 6.

FIG. 7 is an explanatory diagram illustrating an example of the data transfer performed by the multicast instruction of FIG. 6. FIG. 7 also illustrates an example in which each third hierarchical block BLK3 includes 8 second hierarchical blocks BLK2 and each second hierarchical block BLK2 includes 16 first hierarchical blocks BLK1. "r" indicates identifiers of eight second hierarchical blocks BLK2 in each third hierarchical block BLK3. "p" indicates the data transfer source address in the memory MEM2 of the second hierarchical block BLK2. "q" indicates the data transfer destination address in the memory MEM2 of the second hierarchical block BLK2. In FIG. 7, for simplicity of description, it is assumed that each of "p" and "q" has a fixed value. Additionally, FIG. 7 illustrates an example of an operation performed when "r" is "1".

In "Multicast 1 to 7", the data at the address p of the memory MEM2 of the r-th second hierarchical block BLK2 is moved to the address q of each of the memories MEM2 of the seven second hierarchical blocks BLK2 other than the r-th second hierarchical blocks BLK2. In "Multicast instruction 1 to 7", because there are eight data transfer sources (="r") in the eight second hierarchical blocks BLK2, eight types of data transfer can be performed.

In "Multicast instruction 2 to 6", the data at the address p of the memory MEM2 of the r-th second hierarchical block BLK2 is moved to the address q of the memory MEM2 of each of the zero-th to third second hierarchical blocks BLK2 (except the r-th second hierarchical block BLK2). Further, the data at the address p of the memory MEM2 of the (4+r)-th second hierarchical block BLK2 is moved to the address q of the memory MEM2 of each of the fourth to seventh second hierarchical blocks BLK2 (except the (4+r)-th second hierarchical block BLK2). In "Multicast instruction 2 to 6", because there are four data transfer sources (="r") for each of the four second hierarchical blocks BLK2, four types of data transfer can be performed.

In "Multicast instruction 4 to 4", the data at the addresses p of the memories MEM2 of the r-th, (2+r)-th, (4+r)-th, and (6+r)-th second hierarchical blocks BLK2 are respectively moved to the addresses q of the memories MEM2 of the (1−r)-th, (3−r)-th, (5−r)-th, and (7−r)-th second hierarchical blocks BLK2. In "Multicast 4 to 4", because there are two data transfer sources (="r") for each two second hierarchical blocks BLK2, two types of data transfer can be performed. Therefore, 14 types (8+4+2) of the data transfer can be performed by the three types of multicast instructions illustrated in FIG. 7. In other words, in the present embodiment, the arithmetic processing device 100 can use 14 types of multicast instructions for the data transfers between the second hierarchical blocks BLK2 and between the third hierarchical blocks BLK3.

Figure 8:
FIG. 8 is an explanatory diagram illustrating an example of data transfers between eight second hierarchical blocks BLK2 in a third hierarchical block BLK3.

FIG. 8 is an explanatory diagram illustrating an example of the data transfers between the eight second hierarchical blocks BLK2 in the third hierarchical block BLK3. In the following, an example of setting the state (A) to the state (D) will be described on the assumption that it is determined that the number of instructions is minimized by executing the multicast instructions "Multicast 2 to 6" and "Multicast 4 to 4" in this order, based on the single source shortest path problem, which is one type of dynamic programming. The state (D) is a state in which the data S1-S7 in the memories MEM2 of the second hierarchical blocks BLK2(1) to BLK2 (7) in the state (A) have been respectively moved to the memories MEM2 of the second hierarchical blocks BLK2 (0) to BLK(6).

First, the arithmetic processing device 100 executes the multicast instruction "Multicast 2 to 6" in the state (A). As a result, the data S2 in the second hierarchical block BLK2 (2) (k=2) is moved to the second hierarchical blocks BLK2 (0), BLK2(1), and BLK2(3), the data S6 in the second hierarchical blocks BLK2(6) (4+k=6) is moved to the second hierarchical blocks BLK2(4), BLK2(5), and BLK2(7), and the state transitions to the state (B). Here, in each multicast instruction, the data in the memory MEM2 of the second hierarchical block BLK2 is transferred to the memory MEM2 of other second hierarchical blocks BLK2 via the memory MEM3.

Next, the arithmetic processing device 100 executes the multicast instruction "Multicast 4 to 4" in the state (B). As a result, the data S1 in the second hierarchical block BLK2 (1) (k=1) is moved to the second hierarchical block BLK2 (0), and the data S3 in the second hierarchical block BLK2 (3) is moved to the second hierarchical block BLK2(2). The data S5 in the second hierarchical block BLK2 (5) is moved to the second hierarchical block BLK2(4), the data S7 in the second hierarchical block BLK2(7) is moved to the second hierarchical block BLK2(6), and the state transitions to the state (C).

Next, the arithmetic processing device 100 executes the unicast instruction in the state (C) after the execution of all the multicast instructions. As a result, the data S4 in the second hierarchical block BLK2(4) is moved to the second hierarchical block BLK2(3), and the state transitions to the state (D) to complete the desired data transfer. From the state (C) to the state (D), a unicast instruction for transferring the data S4 to the memory MEM3 of the third hierarchical block BLK3 and a unicast instruction for transferring the data S4 from the memory MEM3 to the second hierarchical block BLK2(3) are executed. Thus, the data transfer illustrated in FIG. 8 can be performed by the two multicast instructions and the two unicast instructions.

An example of generalizing a state change illustrated in FIG. 8 will be described below. For example, the data at the addresses src of the second hierarchical blocks BLK2(0) to BLK2(7) are respectively S0, S1, . . . , and S7. The address src is a transfer source address. As described above, by combining the multicast instructions and the unicast instructions, the data D0, D1, . . . , and D7 are placed in the addresses dst (addresses different from the addresses src) of the second hierarchical block BLK2(0) to BLK2(7) with the minimum number of instructions. The address dst is a transfer destination address. Here, "Data D0, . . . , D7 ∈

{Data S0, . . . , S7, Wild}" is established. "Wild" represents any data that can be placed and data without any purpose. For example, "D0, . . . , D7=S1, . . . , S7, Wild" is established.

Next, scheduling based on the single source shortest path problem, which is one type of dynamic programming, will be described. The unicast instruction is used in the final data transfer because the unicast instruction is used for the final adjustment of the data transfer. That is, after a sequence of a predetermined number of types of multicast instructions is executed, a sequence of a predetermined number of types of unicast instructions is executed. In the following, after an overall idea is first described, an arrival at the single source shortest path problem is described.

A state changed by the sequence of multicast instructions is represented by a set (x0, x1, . . . , x7). However, the state of each set is represented as x0, . . . , x7 ∈ {o, x, -}. "xk=o" (k is any one of 0 to 7) indicates that the address dst of the k-th second hierarchical block BLK2(k) is updated by the sequence of multicast instructions, and Dk is placed. "xk=x" indicates that the address dst of the k-th second hierarchical block BLK2(k) is updated by the sequence of multicast instructions and Dk is not placed. "xk=-" indicates that the address dst of the k-th second hierarchical block BLK2(k) is not updated by the sequence of multicast instructions.

In the single source shortest path problem, searching is basically performed for all patterns to obtain the optimal sequence of multicast instructions, but in this case, the compiler 500A determines the instruction from the last in the execution order. In the actual execution order of the instructions, for example, as illustrated in FIG. 8, the multicast instruction "Multicast 2 to 6@2" (k=2) and the multicast instruction "Multicast 4 to 4@1" (k=1) are used in this order. However, when dynamic programming is used, the compiler 500A first examines what state is caused by the multicast instruction "Multicast 4 to 4@1". For example, the state "s0=(-, -, . . . , -)" changes to "S1, -, S3, -, S5, -, S7, -", and then the state "s1=(o, -, o, -, o, -, o, -, o, -)" is obtained.

Next, the compiler 500A examines inserting the multicast instruction "Multicast 2 to 6@2" before the multicast instruction "Multicast 4 to 4@1". Then, "S1, S2, S3, S2, S5, S6, S7, S6" is obtained, and the state "s2=(o, o, o, x, o, o, o, x)" is obtained. As described above, even any one of the multiple types of multicast instructions is inserted at the top side, "o" and "x" do not change, and only "-" changes.

Next, an arrival at the single source shortest path problem is examined. First, vertices corresponding to respective states are prepared. V(s) represents a vertex corresponding to the state s. The initial state is defined as "s0=(-, -, . . . , -)", and an arrival to the single source shortest path problem is considered from the initial state. The transition is performed by inserting one multicast instruction at the top.

Precisely, for each vertex V(s) and each multicast instruction m (m is any one of 14 types of multicast instructions), an edge of cost 1 is formed from V(s) to V(s'). Here, "s'" represents a state of a result of inserting the multicast instruction m at the top of the sequence of multicast instructions for changing the state from "s0" to "s" and executing the inserted sequence from the multicast instruction m in order with respect to the initial state. For example, in the above example, when "s=s1" and "m=Multicast 2 to 6@2", "s'=s2" is established. Additionally, the same "s'" can be reached by executing the multicast instruction m regardless of which one of the sequences of multicast instructions is taken for changing the state from "s0" to "s".

The compiler 500A can obtain an optimal sequence of multicast instructions for all possible states s by solving the single source shortest path problem of the constructed weighted digraph from "s0". Thereafter, the compiler 500A obtains a sequence that minimizes "(the number of multicast instructions used to change the state from s0 to s)+(the number of unicast instructions used to change the state from s to (o, . . . , o))" for each "s". "The number of unicast instructions used to change the state from s to (o, . . . , o)" is equal to "(the number of elements that are not o in s)×2".

The calculation amount and optimization will be described below. Here, "o" and "x" can be treated in the same way. For "x", because the cost calculated by multiplying the number of "x"s by two is added at the end, the cost of the edge may be +2. Although the number of states appears to be large, by treating "o" and "x" in the same way, it is indicated that there are only 15 states due to the nature of the multicast instructions. The number of states (15 states) is proportional to the number of the second hierarchical blocks BLK2.

Further, if the self-loop is excluded, there is only a transition in which the number of "-" decreases, there is no closed path, and thus the calculation can be performed linearly. As a result, the calculation amount can be further reduced. If the number of types of multicast instructions is proportional to the number of the second hierarchical blocks BLK2, the time calculation amount is proportional to "(the number of the second hierarchical blocks BLK2)^2".

FIG. 9 is a flow diagram illustrating an example of the operation of the compiler 500A achieved by the information processing device 400 of FIG. 5. That is, the flow illustrated in FIG. 9 indicates an example of an instruction generation method performed by the compiler 500A that is achieved by the CPU or the like of the information processing device 400 executing an instruction generation program. Operations substantially the same as those in FIG. 4 are referenced by the same reference numerals, and a detailed description thereof is omitted.

The processes in steps S10, S20, S30, S40, S60, and S70 are substantially the same as those in FIG. 4. After step S40, in step S42, the compiler 500A determines whether a data transfer instruction for performing a data transfer between two blocks BLK adjacent to each other in the hierarchy among the grouped data transfers includes a multicast instruction. Subsequently, the compiler 500A performs step S44 if the multicast instruction is included, and performs step S46 if the multicast instruction is not included.

In step S44, the compiler 500A uses dynamic programming, as described above, to determine the combination and execution order of the multiple types of multicast instructions for at least some of the data transfers between the blocks BLK, and to further determine the unicast instructions to be executed after the multicast instructions. The compiler 500A performs step S46 after step S44.

In step S46, the compiler 500A generates the data transfer instruction for each group of the data transfers divided in step S40 for the data transfers that do not include a multicast instruction. In step S46, the compiler 500A generates the multicast instruction and the unicast instruction determined in step S44 for the data transfers that include the multicast instruction. After the processing of step S46, the compiler 500A performs step S60 and step S70 to complete the operation illustrated in FIG. 9.

As in the embodiment described above, in the present embodiment, the compiler 500A can generate at least one data transfer instruction for executing multiple data transfers in parallel among the data transfers included in multiple queries for each classification according to the number of hierarchies of blocks through which the data is passed. This can move a large amount of data between the blocks BLK with a smaller number of data transfer instructions than the number of data transfer instructions in the conventional method, in the arithmetic processing device 100 in which the blocks BLK including the operation processing units OPU are hierarchized. As a result, the calculation time required for deep learning by the arithmetic processing device 100 or the board 200 can be shortened.

Further, in the present embodiment, the compiler 500A uses dynamic programming to determine the combination and execution order of the data transfer instructions for executing the data transfers between two blocks BLK adjacent in the hierarchy with a small number of instructions, and generates the data transfer instructions in accordance with the determination. This enables the compiler 500A to cancel the search of the instruction sequence in which the number of instructions increases, so that the search space can be gradually reduced. As a result, a suitable combination of the data transfer instructions with a small number of instructions can be found by minimizing the calculation amount in the compiler 500A.

Additionally, in the dynamic programming method, searching the multicast instructions to be used in the execution order from the last can prevent the data transferred by the multicast instruction of the earlier execution order from being rewritten by the multicast instruction of the later execution order. This can suppress wasteful data transfer caused by multicast instructions, and the compiler 500A can generate an appropriate combination of the multicast instructions, having a small number of instructions.

Additionally, the compiler 500A determines a unicast instruction, having a higher degree of freedom of data transfer and a lower data transfer efficiency than a multicast instruction, after determining the multicast instruction to be used. This enables the compiler 500A to minimize the number of unicast instructions having low data transfer efficiency, and can minimize the number of instructions to be used for the data transfer between blocks BLK adjacent to each other in the hierarchy.

Here, in the present embodiment, an example in which the number of instructions to be executed is minimized using dynamic programming with respect to the data transfer between the first hierarchical blocks BLK1 belonging to different second hierarchical blocks BLK2 in the third hierarchical block BLK3 (the classification 3) has been described. However, the appropriate instruction sequence to be searched by dynamic programming is not limited to the data transfer of the classification 3, but may be an instruction sequence used for the data transfer of the classification 1, the classification 2, or the classification 4. Additionally, the instruction sequence determined by the search is not limited to the multicast instruction but may be a special instruction other than the unicast instruction. Here, the special instruction is, for example, an instruction for transferring data to multiple places in parallel.

A part or the whole of the host 300 or the information processing device 400 in the above-described embodiment may be configured by hardware, or may be configured by information processing of software (a program) performed by a CPU, a GPU, or the like. In the case where the embodiment is configured by the information processing of software, software implementing at least a part of the functions of each device in the above-described embodiment may be stored in a non-temporary storage medium (a non-temporary computer-readable medium) such as a compact disc-read only memory (CD-ROM) or a universal serial bus (USB) memory, and may be read into a computer to perform the information processing of software. The software may be downloaded via a communication network. Further, all or a part of the processing of software may be implemented in a circuit such as an application specific integrated circuit (ASIC) or a field programmable gate array (FPGA), so that information processing by the software may be performed by hardware.

The storage medium storing software may be a detachable storage medium such as an optical disk or a fixed storage medium such as a hard disk drive or a memory. Additionally, the storage medium may be provided inside the computer (a main storage device, an auxiliary storage device, and the like) or outside the computer.

FIG. 10 is a block diagram illustrating an example of a hardware configuration of the host 300 and the information processing device 400 illustrated in FIG. 2 and FIG. 5. The information processing device 400 includes, for example, a processor 20, a main storage device 30 (for example, a memory such as a DRAM), an auxiliary storage device 40 (a memory), a network interface 50, and a device interface 60, and may be implemented as a computer in which these components are connected to each other via a bus 70. For example, by the processor 20 executing the instruction generation program, the operations described in FIG. 4 or FIG. 9 are performed.

The information processing device 400 includes one of each component, but may include multiple units of the same components. Additionally, although a single information processing device 400 is illustrated in FIG. 10, software may be installed in multiple information processing devices 400, and each of the multiple information processing devices 400 may perform the same or a different part of processing of the software. In this case, each of the information processing devices 400 may be in the form of distributed computing that performs processing by communicating via the network interface 50 or the like. That is, the information processing device 400 in the above-described embodiment may be configured as a system that achieves a function by one or more information processing devices 400 executing instructions stored in one or more storage devices. Additionally, information transmitted from a terminal may be processed by one or more information processing devices 400 provided on the cloud, and the processing result may be transmitted to the terminal.

The operation described in the flow of FIG. 4 and the operation described in the flow of FIG. 9 may be performed in parallel by using one or more processors 20 or multiple computers connected via a network. Additionally, various operations may be distributed to multiple operation cores in the processor 20 and may be performed in parallel. Some or all of the processes, means, and the like of the present disclosure may be implemented by at least one of a processor and a storage device that are provided on a cloud that can communicate with the information processing device 400 via a network. As described above, the information processing device 400 in the above-described embodiment may be in a form of parallel computing using one or more computers.

The processor 20 may be an electronic circuit (a processing circuit, processing circuitry, a CPU, a GPU, an FPGA, an ASIC, or the like) that performs at least either computer control or an operation. The processor 20 may also be a general purpose processor, a dedicated processing circuit designed to perform a specific operation, or a semiconductor device including both a general purpose processor and a dedicated processing circuit. Additionally, the processor 20 may include an optical circuit or an arithmetic function based on quantum computing.

The processor 20 may perform arithmetic processing based on data and software input from a device or the like in an internal configuration of the information processing device 400, and may output an operation results and a control signal to a device or the like. The processor 20 may control respective components of the information processing device 400 by executing an operating system (OS) of the information processing device 400, an application, and the like.

The information processing device 400 in the above-described embodiment may be implemented by one or more processors 20. Here, the processor 20 may refer to one or more electronic circuits disposed on one chip, or may refer to one or more electronic circuits disposed on two or more chips or two or more devices. In the case where multiple electronic circuits are used, each electronic circuit may communicate by wire or wirelessly.

The main storage device 30 may store instructions executed by the processor 20, various data, and the like, and information stored in the main storage device 30 may be read by the processor 20. The auxiliary storage device 40 is a storage device other than the main storage device 30. These storage devices indicate any electronic component that can store electronic information, and may be a semiconductor memory. The semiconductor memory may be either a volatile memory or a non-volatile memory. The storage device that stores various data and the like in the information processing device 400 in the above-described embodiment may be implemented by the main storage device 30 or the auxiliary storage device 40, or may be implemented by a memory built in the processor 20.

When the information processing device 400 in the above-described embodiment includes at least one storage device (at least one memory) and at least one processor connected (coupled) to the at least one storage device, at least one processor 20 may be connected to a single storage device. Additionally, at least one storage device may be connected to a single processor. A configuration in which at least one of the multiple processors is connected to at least one of the multiple storage devices may also be included. This configuration may be implemented by the storage devices and processors included in the multiple information processing devices 400. Further, a configuration in which the storage device is integrated with the processor (for example, an L1 cache, a cache memory including an L2 cache) may be included.

The network interface 50 is an interface for connecting to a communication network 600 by wire or wirelessly. For the communication network 600, an appropriate interface such as an interface conforming to an existing communication standard may be used. The network interface 50 may be used to exchange information with an external device 710 connected via the communication network 600. Here, the communication network 600 may be a wide area network (WAN), a local area network (LAN), a personal area network (PAN), or any combination thereof, and may be any network for exchanging information between the information processing device 400 and the external device 710. An example of WAN is the Internet and the like, an example of LAN is IEEE 802.11, Ethernet (registered trademark), and the like, and an example of PAN is Bluetooth (registered trademark), near field communication (NFC), and the like.

The device interface 60 is an interface such as a USB that is directly connected to the external device 720.

The external device 710 is connected to the information processing device 400 via a network. The external device 720 is directly connected to the information processing device 400.

The external device 710 or the external device 720 may be, for example, an input device. The input device is, for example, a device such as a camera, a microphone, a motion capture, various sensors, a keyboard, a mouse, a touch panel, and the like, and provides acquired information to the information processing device 400. Additionally, the external device 710 or the external device 720 may be a device including an input unit, a memory, and a processor, such as a personal computer, a tablet terminal, a smartphone, or the like.

The external device 710 or the external device 720 may be, for example, an output device. The output device may be, for example, a display device such as a liquid crystal display (LCD) or an organic electro luminescence (EL) panel, or a speaker outputting sound or the like. Additionally, the external device 710 or the external device 720 may be a device including an output unit, a memory, and a processor, such as a personal computer, a tablet terminal, a smartphone, or the like.

The external device 710 or the external device 720 may be a storage device (a memory). For example, the external device 710 may be a network storage or the like, and the external device 720 may be a storage such as an HDD or the like.

The external device 710 or the external device 720 may be a device having functions of some of the components of the information processing device 400 in the above-described embodiment. That is, the information processing device 400 may transmit part or all of the processing results to the external device 710 or the external device 720, or may receive part or all of processing results from the external device 710 or the external device 720.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), if the expression such as "in response to data being input", "using data", "based on data", "according to data", or "in accordance with data" (including similar expressions) is used, unless otherwise noted, a case in which the data itself is used and a case in which data obtained by processing the data (e.g., data obtained by adding noise, normalized data, a feature amount extracted from the data, and intermediate representation of the data) is used are included. If it is described that any result can be obtained "in response to data being input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states may be included. If it is described that "data is output" (including similar expressions), unless otherwise noted, a case in which the data itself is used as an output is included, and a case in which data obtained by processing the data in some way (e.g., data obtained by adding noise, normalized data, a feature amount extracted from the data, and intermediate representation of the data) is used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general purpose processor, the processor may have a hardware configuration that can perform the operation B and be configured to actually perform the operation B by setting a permanent or temporary program (i.e., an instruction). If the element A is a dedicated processor, a dedicated arithmetic circuit, or the like, a circuit structure of the processor may be implemented so as to actually perform the operation B irrespective of whether the control instruction and the data are actually attached.

In the present specification (including the claims), if a term indicating inclusion or possession (e.g., "comprising", "including", or "having") is used, the term is intended as an open-ended term, including inclusion or possession of an object other than a target object indicated by the object of the term. If the object of the term indicating inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, and/or states, and that the advantage/result is not necessarily obtained by the configuration. The advantage/result is merely an advantage/result that is obtained by the configuration described in the embodiment when various factors, conditions, and/or states are satisfied, and is not necessarily obtained in the invention according to the claim that defines the configuration or a similar configuration.

In the present specification (including the claims), claims), if a term such as "maximize" or "maximization" is used, it should be interpreted as appropriate according to a context in which the term is used, including obtaining a global maximum value, obtaining an approximate global maximum value, obtaining a local maximum value, and obtaining an approximate local maximum value. It also includes obtaining approximate values of these maximum values, stochastically or heuristically. Similarly, if a term such as "minimize" or "minimization" is used, it should be interpreted as appropriate, according to a context in which the term is used, including obtaining a global minimum value, obtaining an approximate global minimum value, obtaining a local minimum value, and obtaining an approximate local minimum value. It also includes obtaining approximate values of these minimum values, stochastically or heuristically. Similarly, if a term such as "optimize" or "optimization" is used, the term should be interpreted as appropriate, according to a context in which the term is used, including obtaining a global optimum value, obtaining an approximate global optimum value, obtaining a local optimum value, and obtaining an approximate local optimum value. It also includes obtaining approximate values of these optimum values, stochastically or heuristically.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while another hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data. Additionally, a configuration in which some of the multiple storage devices store data may be included.

Although the embodiments of the present disclosure have been described in detail above, the present disclosure is not limited to the individual embodiments described above. Various additions, modifications, substitutions, partial deletions, and the like can be made without departing from the conceptual idea and spirit of the invention derived from the contents defined in the claims and the equivalents thereof. For example, in the embodiments described above, if numerical values or mathematical expressions are used for description, they are presented as an example and do not limit the scope of the present disclosure. Additionally, the order of respective operations in the embodiments is presented as an example and does not limit the scope of the present disclosure.

What is claimed is:

1. An instruction generating method of generating an instruction sequence to be executed by an arithmetic processing device including a plurality of second blocks, each of the plurality of second blocks including a plurality of first blocks and at least one second memory, each of the plurality of first blocks including at least one arithmetic unit and at least one first memory, the instruction generating method comprising:

generating, by at least one processor, the instruction sequence that causes the arithmetic processing device to perform at least one of first data transfers in parallel, second data transfers in parallel, third data transfers in parallel, or fourth data transfers in parallel, wherein transfer sources of the first data transfers are one or more first blocks among the plurality of first blocks, transfer destinations of the first data transfers are one or more first blocks among the plurality of first blocks, wherein transfer sources of the second data transfers are one or more first blocks among the plurality of first blocks, transfer destinations of the second data transfers are one or more second blocks among the plurality of second blocks, wherein transfer sources of the third data transfers are one or more second blocks among the plurality of second blocks, transfer destinations of the third data transfers are one or more first blocks among the plurality of first blocks, wherein transfer sources of the fourth data transfers are one or more second blocks among the plurality of second blocks, transfer destinations of the fourth data transfers are one or more second blocks among the plurality of second blocks, wherein the generating of the instruction sequence comprises generating the instruction sequence by utilizing at least one multicast instruction selected from more than one type of multicast instructions, and wherein the generating of the instruction sequence further comprises determining a combination and execution order of the at least one multicast instruction selected from the more than one type of multicast instructions.

2. The instruction generating method as claimed in claim 1, wherein the transfer sources and the transfer destinations are identified by at least one of a memory address, a register number, an identifier of an operation processing unit included in each of the plurality of first blocks, an identifier of the first memory, an identifier of the second memory, an identifier of each of the plurality of first blocks, or an identifier of each of the plurality of second blocks.

3. The instruction generating method as claimed in claim 1, wherein the generating of the instruction sequence further comprises:
   generating information for invalidating at least a part of a plurality of data transfers included in at least one of the first data transfers, the second data transfers, the third data transfers, or the fourth data transfers; and
   generating the instruction sequence that includes the generated information.

4. The instruction generating method as claimed in claim 1,
   wherein the generating of the instruction sequence further comprises determining the combination and execution order of the at least one multicast instruction selected from the more than one type of multicast instructions using dynamic programing.

5. The instruction generating method as claimed in claim 4,
   wherein the generating of the instruction sequence further comprises determining a combination and execution order of another data transfer instruction after determining the combination and execution order of the at least one multicast instruction.

6. The instruction generating method as claimed in claim 1,
   wherein identifiers of transfer sources of data transfers to be performed in parallel among the first data transfers, the second data transfers, the third data transfers, and the fourth data transfers are identical to each other, and identifiers of transfer destinations of data transfers to be performed in parallel among the first data transfers, the second data transfers, the third data transfers, and the fourth data transfers are identical to each other.

7. The instruction generating method as claimed in claim 6,
   wherein first identifiers are assigned to the plurality of first blocks included in each of the plurality of second blocks, the first identifiers being different from each other in each of the plurality of second blocks and being common among the plurality of second blocks, and
   wherein second identifiers are assigned to the plurality of second blocks, the second identifiers being different from each other.

8. The instruction generating method as claimed in claim 1,
   wherein the arithmetic processing device further includes a plurality of third blocks, each of the plurality of third blocks including the plurality of second blocks and at least one third memory, and
   wherein the instruction generating method further comprising generating the instruction sequence that causes the arithmetic processing device to perform at least one of fifth data transfers in parallel, sixth data transfers in parallel, or seventh data transfers in parallel,
   wherein transfer sources of the fifth data transfers being one or more third blocks among the plurality of third blocks, transfer destinations of the fifth data transfers being one or more third blocks among the plurality of third blocks,
   wherein transfer sources of the sixth data transfers being one or more second blocks among the plurality of second blocks, transfer destinations of the sixth data transfers being one or more third blocks among the plurality of third blocks, and
   wherein transfer sources of the seventh data transfers being one or more third blocks among the plurality of third blocks, transfer destinations of the seventh data transfers being one or more second blocks among the plurality of second blocks.

9. The instruction generating method as claimed in claim 1,
   wherein the arithmetic processing device further includes a third block including the plurality of second blocks and at least one third memory,
   wherein the more than one type of multicast instructions include at least one of a first multicast instruction or a second multicast instruction,
   wherein the first multicast instruction causes the arithmetic processing device to perform, in parallel, data transfers from a second block included in the plurality of the second blocks in the third block to other second blocks included in the plurality of the second blocks in the third block, and
   wherein the second multicast instruction causes the arithmetic processing device to perform, in parallel, data transfers from at least two second blocks included in the plurality of the second blocks in the third block to other second blocks included in the plurality of the second blocks in the third block.

10. The instruction generating method as claimed in claim 8,
    wherein each of the multicast instructions causes the arithmetic processing device to perform, in parallel, the same type of data transfers in each of the plurality of third blocks.

11. The instruction generating method as claimed in claim 1, wherein the second data transfers include data transfers from one or more first blocks among the plurality of first blocks to one or more first blocks among the plurality of first blocks via the second memory.

12. The instruction generating method as claimed in claim 1,
wherein the more than one type of multicast instructions are SIMD type data transfer instructions.

13. The instruction generating method as claimed in claim 1,
wherein the generating of the instruction sequence further comprises:
classifying data transfers based on a data transfer path of each of the data transfers, and
generating the instruction sequence based on results of the classification.

14. The instruction generating method as claimed in claim 13,
wherein the generating of the instruction sequence further comprises generating the instruction sequence for each classification.

15. An instruction generating method of generating an instruction sequence to be executed by an arithmetic processing device including a plurality of second blocks, each of the plurality of second blocks including a plurality of first blocks, the instruction generating method comprising:
determining, by at least one processor, based on dynamic programming, a combination and execution order of data transfer instructions by utilizing at least one or more types of multicast instructions; and
generating, by the at least one processor, based on the determined combination and execution order, the instruction sequence that causes the arithmetic processing device to perform at least one of data transfers between two blocks adjacent in a hierarchy or data transfers between two blocks in the same hierarchy,
wherein the determining of the combination and execution order of data transfer instructions includes determining the combination and execution order of data transfer instructions by utilizing at least the one or more types of multicast instructions and one or more types of unicast instructions, and
wherein the determining of the combination and execution order of data transfer instructions includes searching for one or more multicast instructions to be used among the one or more types of multicast instructions from last in the execution order based on dynamic programming.

16. The instruction generating method as claimed in claim 15, wherein the one or more types of multicast instructions are SIMD type data transfer instructions.

17. The instruction generating method as claimed in claim 15,
wherein the instruction sequence causes the arithmetic processing device to perform at least one of the data transfers in parallel between the two blocks adjacent in the hierarchy or the data transfers in parallel between the two blocks in the same hierarchy.

18. An instruction generating device that generates an instruction sequence to be executed by an arithmetic processing device including a plurality of second blocks, each of the plurality of second blocks including a plurality of first blocks and at least one second memory, each of the plurality of first blocks including at least one arithmetic unit and at least one first memory, the instruction generating device comprising:
at least one memory; and
at least one processor;
wherein the at least one processor is configured to generate the instruction sequence that causes the arithmetic processing device to perform at least one of first data transfers in parallel, second data transfers in parallel, third data transfers in parallel, or fourth data transfers in parallel,
wherein transfer sources of the first data transfers are one or more first blocks among the plurality of first blocks, transfer destinations of the first data transfers are one or more first blocks among the plurality of first blocks,
wherein transfer sources of the second data transfers are one or more first blocks among the plurality of first blocks, transfer destinations of the second data transfers are one or more second blocks among the plurality of second blocks,
wherein transfer sources of the third data transfers are one or more second blocks among the plurality of second blocks, transfer destinations of the third data transfers are one or more first blocks among the plurality of first blocks,
wherein transfer sources of the fourth data transfers are one or more second blocks among the plurality of second blocks, transfer destinations of the fourth data transfers are one or more second blocks among the plurality of second blocks,
wherein the generating of the instruction sequence comprises generating the instruction sequence by utilizing at least one multicast instruction selected from more than one type of multicast instructions, and
wherein the generating of the instruction sequence further comprises determining a combination and execution order of the at least one multicast instruction selected from the more than one type of multicast instructions.

19. An instruction generating device that generates an instruction sequence to be executed by an arithmetic processing device including a plurality of second blocks, each of the plurality of second blocks including a plurality of first blocks, the instruction generating device comprising:
at least one memory; and
at least one processor;
wherein the at least one processor is configured to:
determine, based on dynamic programming, a combination and execution order of data transfer instructions by utilizing at least one or more types of multicast instructions; and
generate, based on the determined combination and execution order, the instruction sequence that causes the arithmetic processing device to perform at least one of data transfers between two blocks adjacent in a hierarchy or data transfers between two blocks in the same hierarchy,
wherein the at least one processor determines the combination and execution order of data transfer instructions by utilizing at least the one or more types of multicast instructions and one or more types of unicast instructions, and
wherein the at least one processor searches for one or more multicast instructions to be used among the one or more types of multicast instructions from last in the execution order based on dynamic programming.

20. The instruction generating device as claimed in claim 19,
wherein the instruction sequence causes the arithmetic processing device to perform at least one of the data transfers in parallel between the two blocks adjacent in the hierarchy or the data transfers in parallel between the two blocks in the same hierarchy.

* * * * *